US012566245B2

(12) United States Patent
Welle et al.

(10) Patent No.: US 12,566,245 B2
(45) Date of Patent: Mar. 3, 2026

(54) AUTONOMOUS RADAR SENSOR WHICH TAKES MULTIDIMENSIONAL MEASUREMENTS

(71) Applicant: VEGA Grieshaber KG, Wolfach (DE)

(72) Inventors: Roland Welle, Hausach (DE); Joerg Boersig, Schapbach (DE); Steffen Waelde, Niedereschach (DE); Samuel Kleiser, Gengenbach (DE)

(73) Assignee: VEGA Grieshaber KG, Wolfach (DE)

( * ) Notice: Subject to any disclaimer, the term of this patent is extended or adjusted under 35 U.S.C. 154(b) by 499 days.

(21) Appl. No.: 18/004,917

(22) PCT Filed: Jul. 20, 2020

(86) PCT No.: PCT/EP2020/070479
§ 371 (c)(1),
(2) Date: Jan. 10, 2023

(87) PCT Pub. No.: WO2022/017580
PCT Pub. Date: Jan. 27, 2022

(65) Prior Publication Data
US 2023/0358857 A1 Nov. 9, 2023

(51) Int. Cl.
G01S 7/295 (2006.01)
G01S 7/02 (2006.01)
(Continued)

(52) U.S. Cl.
CPC ............ G01S 7/2955 (2013.01); G01S 7/027 (2021.05); G01S 13/02 (2013.01); G01S 13/426 (2013.01);
(Continued)

(58) Field of Classification Search
CPC ........ G01S 7/2955; G01S 7/027; G01S 13/02; G01S 13/426; G01S 13/788; G01S 2013/0236
(Continued)

(56) References Cited

U.S. PATENT DOCUMENTS

| | | | |
|---|---|---|---|
| 10,788,351 B2 | 9/2020 | Welle et al. | |
| 10,948,333 B2 | 3/2021 | Welle et al. | |

(Continued)

FOREIGN PATENT DOCUMENTS

| | | |
|---|---|---|
| CN | 107677339 A | 2/2018 |
| CN | 108981852 A | 12/2018 |

(Continued)

OTHER PUBLICATIONS

International Search Report issued Apr. 13, 2021 in PCT/EP2020/070479 filed on Jul. 20, 2020, 2 pages.
(Continued)

*Primary Examiner* — William Kelleher
*Assistant Examiner* — Samarina Makhdoom
(74) *Attorney, Agent, or Firm* — Oblon, McClelland, Maier & Neustadt, L.L.P.

(57) ABSTRACT

A radar sensor for sensing the level of a product or the topology of the surface of a product having a continuously operated clock that closes a power supply line to the processor at a predetermined time to activate the processor.

(Continued)

Thereupon, the processor controls the switching arrangement to activate the radar chip.

15 Claims, 4 Drawing Sheets

(51) Int. Cl.
   *G01S 13/02*      (2006.01)
   *G01S 13/42*      (2006.01)
   *G01S 13/78*      (2006.01)

(52) U.S. Cl.
   CPC ..... *G01S 13/788* (2013.01); *G01S 2013/0236* (2013.01)

(58) Field of Classification Search
   USPC ........................................................ 342/175
   See application file for complete search history.

(56) References Cited

U.S. PATENT DOCUMENTS

| | | | |
|---|---|---|---|
| 11,067,427 B2 | 7/2021 | Welle et al. | |
| 11,326,926 B2 | 5/2022 | Welle et al. | |
| 2010/0052974 A1* | 3/2010 | Corbe ..................... | G01S 7/282 |
| | | | 342/124 |
| 2010/0103024 A1* | 4/2010 | Schultheiss ........... | H01L 23/055 |
| | | | 73/290 R |
| 2017/0141453 A1 | 5/2017 | Waelde et al. | |
| 2018/0031687 A1* | 2/2018 | Mueller ................ | G01F 23/244 |
| 2018/0136028 A1* | 5/2018 | Kleman .................... | G01S 7/35 |
| 2019/0310674 A1 | 10/2019 | Weinzierle et al. | |
| 2020/0025600 A1* | 1/2020 | Waelde ............... | H04W 52/386 |
| 2020/0116798 A1* | 4/2020 | Welle ...................... | G01F 23/80 |

FOREIGN PATENT DOCUMENTS

| | | | |
|---|---|---|---|
| CN | 209419280 U | * | 9/2019 |
| CN | 110737251 A | | 1/2020 |
| DE | 10 2018 207 164 A1 | | 11/2018 |
| DE | 10 2018 205 111 B3 | | 5/2019 |
| EP | 2 189 765 A1 | | 5/2010 |
| EP | 3 171 138 A1 | | 5/2017 |
| EP | 3 279 619 A1 | | 2/2018 |
| EP | 3 467 447 B1 | | 9/2019 |
| EP | 3 598 078 A1 | | 1/2020 |
| EP | 3 467 450 B1 | | 9/2020 |
| EP | 3 719 533 B1 | | 5/2022 |
| WO | WO 2017/084701 A1 | | 5/2017 |

OTHER PUBLICATIONS

International Preliminary Report on Patentability and Written Opinion issued Feb. 2, 2023, in PCT/EP2020/070479, 8 pages.

Combined Chinese Office Action and Search Report issued on Jun. 27, 2025 in Chinese Patent Application No. 202080102586.6, 7 pages.

* cited by examiner

AUTONOMOUS RADAR SENSOR WHICH TAKES MULTIDIMENSIONAL MEASUREMENTS

FIELD OF INVENTION

The invention relates to radar measurement technology. In particular, the invention relates to a radar sensor for detecting the level of a product or the topology of the surface of a product, a plurality of uses of such a radar sensor, a method for detecting the level of a product or the topology of the surface of a product, a program element, and a computer-readable medium.

TECHNICAL BACKGROUND

In process automation in the industrial environment, and especially in level measurement, multi-dimensionally, i.e. two- or three-dimensionally measuring radar systems can be used. Such radar sensors are typically supplied with the energy required for operation from an external energy source. The energy requirement can be considerable.

SUMMARY OF THE INVENTION

With this in mind, an object of the present invention is to provide an alternative radar sensor.

This object is solved by the features of the independent patent claims. Further embodiments of the invention result from the subclaims and the following description of embodiments.

A first aspect of the present disclosure relates to a radar sensor that is configured and programmed to detect the level of a product and/or the topology of the surface of the product. The radar sensor may in particular be configured for process automation in an industrial environment and comprises a permanently operated clock, as well as an energy storage device, a computing circuit, for example a processor, possibly in combination with an FPGA, one or more radar circuits or radar chips, and at least a first switching arrangement.

In particular, the permanently operated clock is configured to control the first switching arrangement at a predetermined time in order to close an energy supply line so that the computing circuit is supplied with energy from the energy store and is thus activated. The computing circuit is configured and programmed to control the first switching arrangement after its activation in order to close a (further) energy supply line, so that the wheel chip is supplied with the energy from the energy store necessary for detecting the fill level and/or the topology.

The terms "switching arrangement", "power supply line", "computing circuit" as used in the context of the present disclosure are to be broadly construed.

The term "process automation in the industrial environment" can be understood as a subfield of technology that includes measures for the operation of machines and plants without the involvement of humans. One goal of process automation is to automate the interaction of individual components of a plant in the chemical, food, pharmaceutical, petroleum, paper, cement, shipping or mining industries. For this purpose, a variety of sensors can be used, which are especially adapted to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

One subarea of process automation in the industrial environment concerns logistics automation. In the field of logistics automation, distance and angle sensors are used to automate processes inside or outside a building or within a single logistics facility. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and location of an object is required by the respective application side. Sensors based on optical measurement methods using lasers, LEDs, 2D cameras or 3D cameras that measure distances according to the time-of-flight (ToF) principle can be used for this purpose.

Another sub-area of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

According to an embodiment, the radar sensor comprises a second switching arrangement, wherein the computing circuit is arranged to drive the second switching arrangement after its activation to close a control line to send control signals from the computing circuit to the radar chip.

According to a further embodiment, the radar sensor comprises a third switching arrangement, wherein the computing circuit is arranged to trigger the third switching arrangement after its activation in order to send measurement data from the radar chip to the computing circuit.

According to a further embodiment, the radar sensor comprises a wireless communication module, wherein the computing circuit is arranged to drive the first switching arrangement after its activation to close a power supply line in order to supply the wireless communication module with the power from the energy storage necessary for its operation.

According to a further embodiment, the radar sensor has a hermetically sealed housing without electrical interfaces to the outside. In particular, it is a self-sufficient radar sensor with its own internal power supply.

According to a further embodiment, the radar sensor has a further energy storage device and a fourth switching arrangement. In this case, the clock is arranged to trigger the first switching arrangement at a predetermined time in order to close the power supply line between the first energy storage device and the further energy storage device, in order to first charge the further energy storage device with energy from the first energy storage device. Thereafter, the fourth switching arrangement is then triggered to supply power from the first energy storage device and the further energy storage device to the computing circuit, thereby activating the computing circuit.

Another aspect of the present disclosure relates to the use of a radar sensor described above and below as a microwave barrier and/or for area monitoring of a safety area of a machine.

In the above uses, the steps of "detecting the level of a product or the topology of the surface of a product" may be dispensable. Alternatively, a "determination of a switching signal" may be provided. Corresponding methods may be known to the skilled person.

Another aspect of the present disclosure relates to a method for detecting the level of a product and/or the topology of the surface of a product. The method comprises the following steps: Driving a first switching arrangement at a predetermined time by a clock internal to the device to close a power supply line to supply power from an energy storage internal to the device to a computing circuit to activate the computing circuit, Driving the first switching arrangement by the computing circuit to close a power supply line to supply power from the energy storage necessary to detect the level and/or topology to a radar chip.

Another aspect of the present disclosure relates to a program element that, when executed on a computing circuit of a radar sensor described above and below, instructs the radar sensor to perform the steps described above and below.

Another aspect of the present disclosure relates to a computer-readable medium on which a program element described above is stored.

In the following, embodiments of the present disclosure are described with reference to the figures. The representations in the figures are schematic and not to scale. If the same reference signs are used in the following description of figures, these designate the same or similar elements.

DETAILED DESCRIPTION OF EMBODIMENTS

Figure 1:
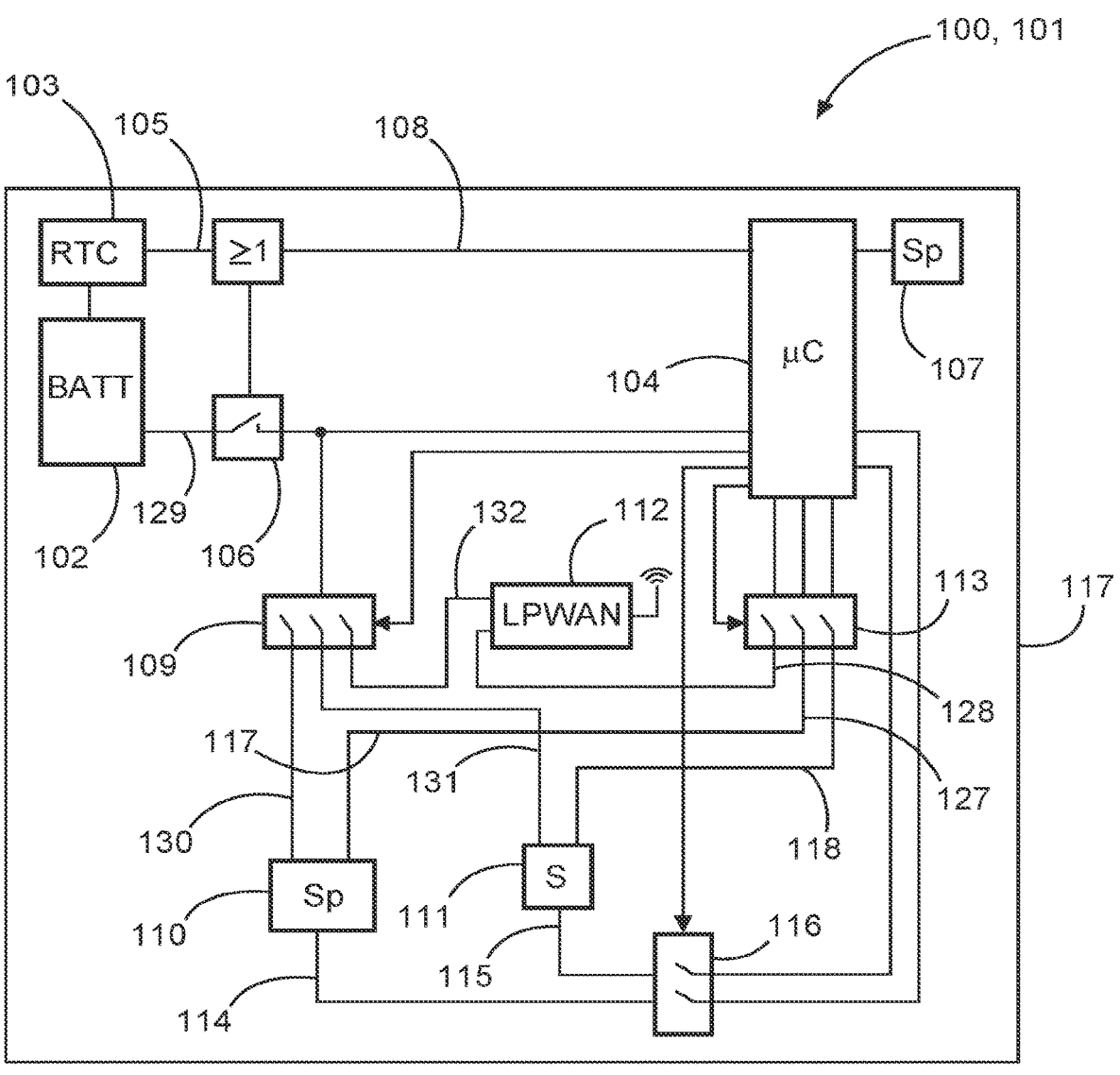
FIG. 1 shows a radar sensor according to an embodiment.

FIG. 1 shows a multi-dimensional, i.e. two- or three-dimensional measuring radar sensor 100, which can be configured and programmed in particular for process automation or factory automation in an industrial environment. The radar sensor can be configured, for example, but not exclusively, as a three-dimensionally measuring radar system for measuring bulk material stockpiles (topology-detecting radar system), but also as a multi-dimensionally measuring microwave barrier. In particular, it can be designed to be self-sufficient, i.e., without an external power supply.

Multidimensional measuring sensors known to date are extremely energy-consuming due to existing system architectures. In addition, the transmission of measurement results in multidimensional radar systems has so far been realized by wire, which leads to high costs for the installation and maintenance of the devices.

The basic ideas and embodiments of the present disclosure eliminate the aforementioned disadvantages. In particular, a multi-dimensional measuring radar system, hereinafter also referred to as a radar sensor, is proposed for factory, logistics or process automation, which obtains all of its energy required for operation from at least one energy source integrated in the device, for example a battery, and which is further configured to provide the determined measured values and/or values derived therefrom to the outside using wireless communication technology.

The autonomously operating, one-dimensional measuring radar systems 100 can be used in particular in the field of process automation, but also in the field of factory automation or safety technology, to determine the distance to an object, and provide it to the outside via a 2-wire interface (4 . . . 20 mA) or a 3-wire interface (IO-Link) or a wireless interface 112.

In addition, it is possible to use multi-dimensional radar systems 100 for automation applications. The basis for this is radar systems on chip (RSoC), which provide a large number of hardware components for implementing multiple transmit channels and multiple receive channels for radar signals, including the necessary digital control circuits on a single chip.

Multidimensional measuring radar sensors 100 can also be used for measuring containers in stationary production plants. Further fields of application for the use of such measuring devices can be found in particular in the logistics sector or also in decentralized measuring scenarios such as the monitoring of river levels. The core idea here is to set up the radar sensor, determine the measured value completely autonomously, and forward this wirelessly to a higher-level communication network.

On the wireless communication side, there has been a rapid advancement in technology in recent years, which has resulted in particular in new narrowband radio technologies for use in energy-saving IoT devices. The disadvantage of these technologies is that they can only transmit a limited number of user data bytes.

On the integrated radar systems on chip (RSoC) side, however, there has been no significant improvement in terms of energy-saving solutions. Since these components are primarily developed for use in the automotive sector, there will be no fundamental improvement in terms of energy consumption in the next few years.

The autonomously measuring, multi-dimensional radar sensor 100 shown in FIG. 1 draws all of its energy required for operation entirely from an energy storage device 102, such as a battery 102, integrated into the device.

Permanently connected to the energy storage 102 is a permanently operated real-time clock (RTC) 103, which can be parameterized by the processor 104 via a communication line not shown here. When a pre-parameterized activation time is reached, the RTC 103 generates a logic switching signal at its output 105, with which a switching element 106, which is part of a first circuit arrangement 106, 109 and can be, for example, a semiconductor transistor 106, can be controlled and closed. This closure connects the battery 102 to the processor 104 via the power supply line 129, thereby activating the processor 104, whereupon the processor 104 reads and executes a program code from a non-volatile memory 107. In particular, the processor 104 assumes a self-holding function via the line 108 by henceforth assuming control of the switch 106. As part of the program execution, the processor 104 may activate, i.e., apply supply voltage to, various components via the power supply switch 109. In particular, power may be supplied here to a first radar chip 110 via the power supply line 130, to a second radar chip 111 via the power supply line 131, and/or also to a wireless communication module 112, for example an LPWAN module 112, via the power supply line 132. For parameterization and/or control purposes, at least one control line 117, 118, 128 between the processor 104 and the units 110, 111, 112 can additionally be connected and also disconnected again via the control switch 113. In this way, it can be achieved in particular that the units 110, 111, 112 draw undefined cross currents from the processor via the control lines during the period without power supply, which would adversely affect the power consumption. For precisely the same reasoning, the data lines 114, 115, over which the data from the radar chips 110, 111 are transmitted into the processor 104 during activated measurement, can be disconnected from the processor via the data line switch 116 during periods of deactivation.

It should be noted at this point that all of the switching arrangements 109, 113, 116 shown in FIG. 1 can have a large number of individual switching elements via which a large number of actually existing, electrically necessary line connections can be closed and/or opened, depending on the respective signal technology. For example, the control lines 117, 118 may be SPI, QSPI or IIC technology, which may comprise, for example, a transmit line, a receive line, a chip select and/or a clock line. In technical implementation, the representation of a single line 117, 118 may mean the insertion of a plurality of electrical lines in a manner known to those skilled in the art. Corresponding considerations also apply to the signal lines 114, 115. Furthermore, it should be noted that a "closing" of a switch element within the switches 109, 113, 116 may mean an establishment of an electrical connection or may also mean an activation of a driver circuit or a level converter. Furthermore, an "opening" of a switch element within the switches 109, 113, 116 can mean a disconnection of an electrical connection or but also a deactivation of a driver circuit or a level converter or but also a switching to a high impedance state. In this way, it can be prevented that undefined cross currents, which negatively influence the energy consumption, can flow from an activated component 104 to a deactivated component 110, 111.

The present arrangement provides a first radar chip 110 and a second radar chip 111 for implementing a multi-dimensional measuring radar system, which are connected to the processor 104 via the data lines 110, 111. The processor 104, which has been specially developed to match the radar chips 110, 111, has specialized data line interfaces for this purpose, for example synchronous high-speed interfaces such as LVDS or CSI-2. In addition, the processor 104 has specialized arithmetic units which enable energy-efficient, fast processing of the process steps for multi-dimensional radar measurement. It should be noted here that a device 101 may also be operated with more or fewer radar chips 110, 111.

Since the entire device 101 has no electrical connections to the outside, one embodiment may provide for arranging all components belonging to the device 101 within a hermetically sealed housing 117, thus ensuring maximum protection against external influences.

Figure 2:
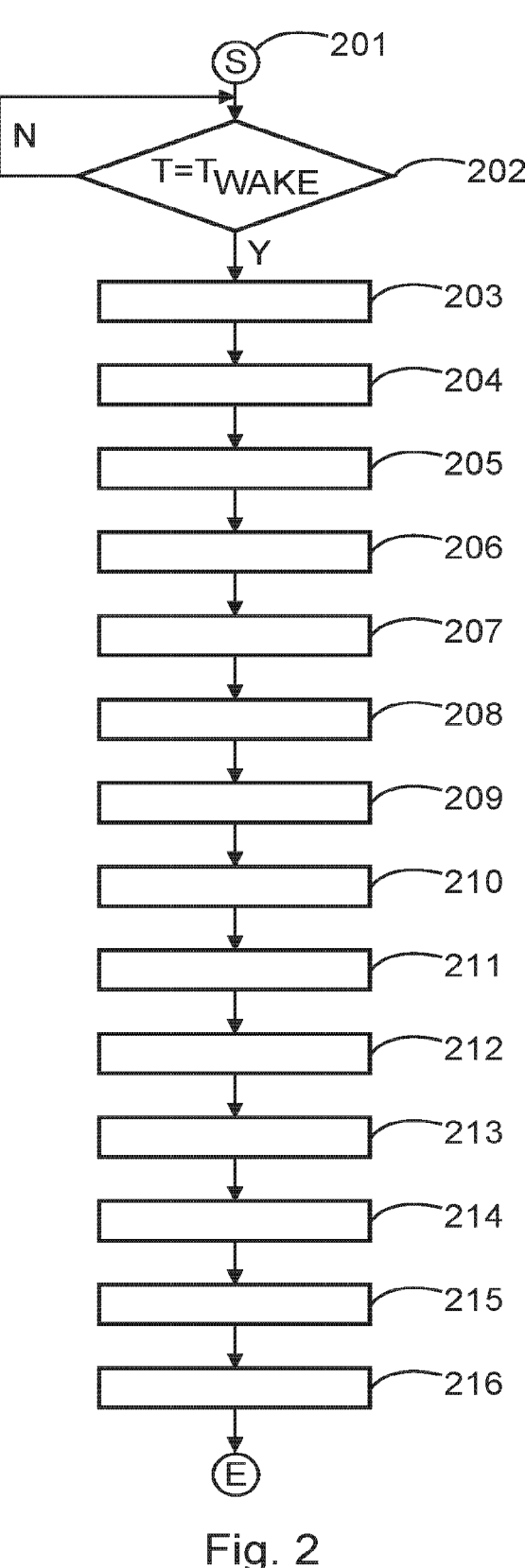
FIG. 2 shows a flow diagram of a process according to an embodiment.

FIG. 2 shows a flowchart of the operation of the device 101. The procedure begins with the start state 201. In step 202, the RTC 103 checks whether a new alarm time has been reached. If so, closing the switch 106 activates the processor 104, and the software program is loaded from the non-volatile memory 107 and executed. In step 203, the processor activates the latch via line 108, and programs the next alarm time point of the real-time clock 105 via a communication line not shown here. In step 204, power is supplied to the radar chips 110, 111 by closing the appropriate power supply switches 109. Subsequently, in step 205, the control lines 117, 118 of the wheel chips 110, 111 are connected to the processor 104 by suitable control commands. For this purpose, in particular a part of the control line switches 113 is closed. By additionally closing the data line switches 116 in step 206, the RSoC's are now finally connected to the processor 104. By transmitting suitable drive sequences with the aid of the control lines 117, 118, in step 207 the processor can transfer the radar chips to an operationally ready state. Here, in particular, initialization and parameterization commands are transmitted to the wheel chips. The lines 117, 118 are connected here in particular to synchronous serial interfaces, for example to SPI or QSPI interfaces. In step 208, the radar chips are then controlled to perform a measurement with at least one activated radio frequency transmitter and one activated radio frequency receiver. The data acquired by the RSoC's 110, 111 during this measurement is transmitted to the processor 104, for example, via the data lines 114, 115, and stored in a memory located in or outside the processor. In step 209, the shutdown of the radar chips begins by first disconnecting the processor 104 by opening the switches 113, 116 associated with the lines 117, 118, 114, 115. The processor controls the switches 113, 116 by appropriate signals, for example via GPIO pins. In step 210, further unnecessary power consumption of the RSoC's 110, 111 is completely inhibited by processor-initiated opening of the associated power supply switches 109. In step 211, a measured value is determined within the processor 104 based on the acquired data according to known procedural steps using the specialized arithmetic units. In order for this to be provided wirelessly to the outside, in step 212, the power supply switch 109 of the wireless unit 112 is closed, and in step 213, the control line switch 113 to the wireless unit is closed. In step 214, the determined measured value is transmitted to the outside via the radio unit 112. Advantageously, but by no means restrictively, it may be envisaged here to use low power radio standards (LPWAN) such as LoRa, NB-loT or Sigfox. However, it may also be envisaged to use other radio standards to transmit measured values and status values. In step 215, the switches 109, 113 are reopened, disabling the wireless module 112. In step 216, the processor 104 disables the latch 108, causing the switch 106 to open and the entire arrangement 101 to enter a powered down state. After the next parameterized alarm time in the real time clock 103 is exceeded, the above procedure begins again.

It may be considered a core aspect of the present disclosure to completely deactivate the device 101 between two measurements, thereby achieving maximum energy savings. It is further an element of the present disclosure to activate individual components only as briefly as possible, and then to de-energize them as quickly as possible. Further, it may be advantageously contemplated to use specialized processors 104 that can efficiently process a computing task according to the disclosure in a power-saving manner, thereby further saving power and maximizing the life of the battery 102.

Figure 3:
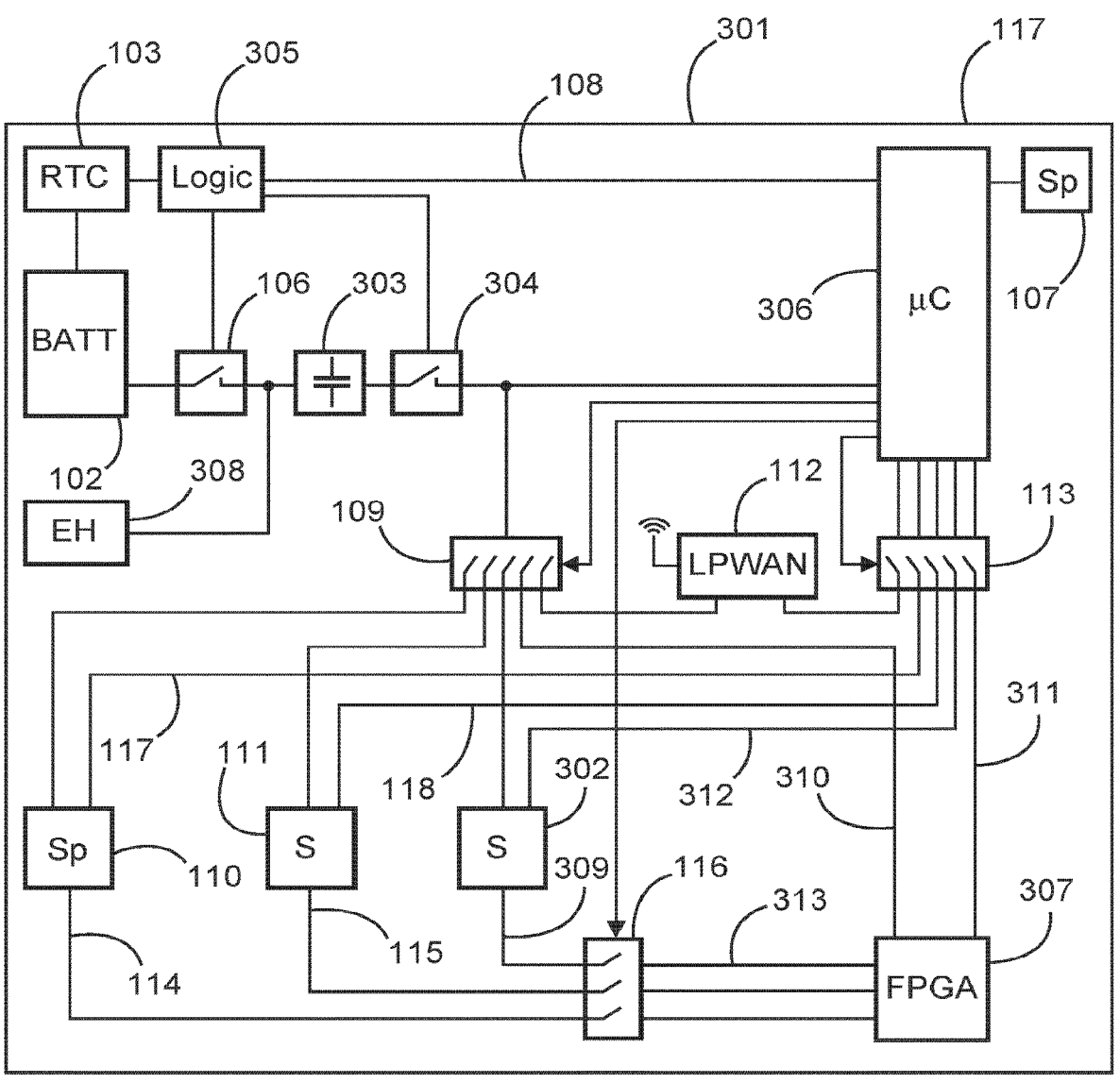
FIG. 3 shows a radar sensor according to a further embodiment.

The presented design example allows the construction of simple multi-channel radar systems with up to two radar chips. Even better measurement results can be achieved by further increasing the number of radar chips. FIG. 3 shows a further embodiment example according to the disclosure, the principles of which can also be applied to systems 301 with a plurality of RSoC's. Identical reference signs indicate identical or similar components as in FIG. 1.

The improved, multi-dimensional measuring radar system 301 has a further radar chip 302, which can improve the imaging properties and in particular the spatial resolution of the arrangement compared to the example of FIG. 1. Since the parallel operation of a plurality of radar chips 110, 111, 302 can cause enormous current peaks on the supply line of the chips, it is envisaged that, after an alarm time of the RTC 103 has been reached, the switch 106 is first closed via a state machine permanently impressed in a programmable logic module 305, which results in an intermediate storage 303, for example a capacitor 303 or a battery 303, being filled with energy. In particular, supplemental energy from an energy harvesting module 308 may be used for this purpose. After reaching the charged state, the logic 305 closes the switch 304, which leads to the activation of the low power processor 306 used. In contrast to the embodiment example of FIG. 1, this processor is optimized exclusively for maximum energy savings, and in particular has no specialized interfaces and arithmetic units for cooperation with the RSoCs 110, 111, 302. The signals 114, 115, 309 of the RSoCs are read out and the signals are processed in a hardware unit 307 specialized for this purpose, for example an ASIC 307 or an FPGA 307.

The FPGA 307 is used to address the special requirements of building multi-dimensional radars with respect to the evaluation of a plurality of RSoC's 110, 111, 302 and with respect to the required computer architecture to efficiently compute the evaluation steps for the radar signals. At this point, classical SRAM based FPGA's can be used, which have to be reconfigured after any connection to a supply voltage 310 from the outside via a control line 311, for example a synchronous control line 311 like SPI or QSPI, with a binary programming sequence (bitstream). However, integrated SRAM based FPGA's with a flash memory integrated in the package can also be used. In this case, configuring the FPGA via the control line 311 can be dispensable, since correspondingly pre-programmed FPGA's independently load the configuration data from the flash memory directly after connection to an operating voltage 310. In a particularly advantageous embodiment, it may also be envisaged to provide non-volatile FPGA technologies 307. These are built on the basis of flash technology, and in the environment of the present disclosure offer the particular advantage of not losing the configured bitstream logic after a one-time configuration at the factory or during an initial start-up. Rewriting a binary programming sequence (bitstream) can consequently be omitted during operation.

Figure 4:
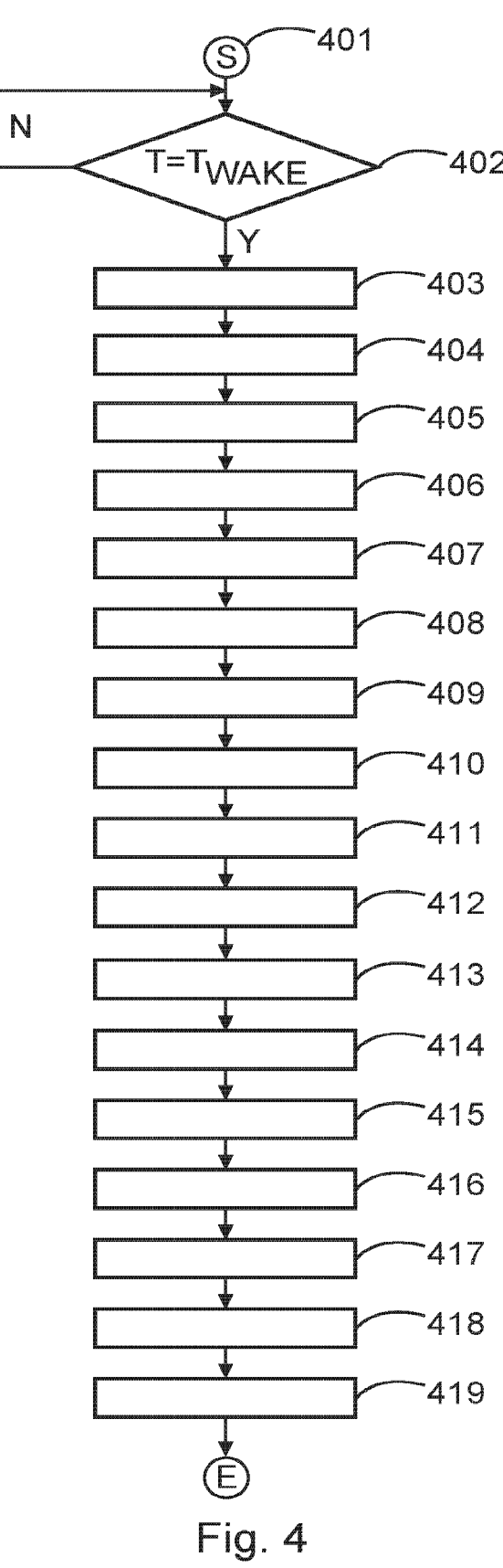
FIG. 4 shows a flow diagram according to a further embodiment.

FIG. 4 shows a flowchart for operating a device 301. The procedure begins with the start state 401. In step 402, the RTC 103 checks whether a new alarm time has been reached. If this is the case, in step 403, logic 305 is used to close switch 106, and energy storage 303 is charged with energy from battery 102 and/or an energy harvesting module 308 (photovoltaic module, thermocouple, wind turbine, . . . ). After reaching the state of charge, the logic module 305 closes the switch 304 in step 404 and activates the processor 306. In step 405, this loads its program flow logic from a non-volatile memory element 107, parameterizes the next alarm time of the RTC 103 and activates the latch 108. Subsequently, in step 406, the processor controls the supply switches 109 of the wheel chips 110, 111, 302. In step 407, the sequence logic of the processor 306 connects the control lines 117, 118, 312 of the wheel chips to synchronous serial interfaces of the processor 306, for example to SPI or QSPI interfaces of the processor 306, by appropriately driving the control switches 113. In step 408, the wheel chips 110, 111, 302 are initialized, configured and brought to an operational state by transmitting appropriate control commands. Before the actual measurement can begin, in step 409 the FPGA 307 is first activated via the switch 109, and then connected to the processor via the control line switch 113. In the present example, it is assumed that the FPGA 307 is a Flash-based FPGA and consequently does not require any further initialization. Otherwise, initialization of the FPGA may now be performed at this point by transmission of a bitstream file by the processor 306. In step 410, the data lines 114, 115, 309, for example the LVDS lines or CSI-2 lines of the radar chips are connected to the FPGA. In step 411, the processor 306 drives the radar chips to perform a measurement, and transfers the resulting data to the FPGA. In step 412, the processor 306 disconnects the wheel chips 110, 111, 302 by opening the respective switches 113, 116, and de-energizes them by opening the power supply switches 109. By imposing an appropriate command via the control line 311, for example an SPI line 311, in step 413 the processor initiates the determination of one or more measured values in the FPGA 307, which is set up by highly specialized hardware components to perform this calculation efficiently. In step 414, the calculation result is transmitted to the processor 306 via the control line 311 before the FPGA 307 is de-energized in step 415 after the control line 311 is disconnected using the switch 109. In step 416, the radio unit 112 is activated by closing the switch 109, and connected to the processor by closing the associated switching element 113. In step 417, the measured value is provided wirelessly to the outside before, in step 418, the wireless module 112 is de-energized again by disconnecting the switches 113, 109. In step 419, the processor 306 disables the latch 108, causing the logic 305 to open the switches 304 and 106 and transition the entire arrangement 301 to an off state. After the next parameterized alarm time in the real time clock 103 is exceeded, the above procedure begins anew.

It should be noted that the processor 306 may form a unitary system on chip with the FPGA. It may also be envisaged that the processor is implemented as a soft core processor within the programmed logic of the FPGA.

It may also be envisaged to integrate calculating units in the RSoCs. This allows the radar signals to be preprocessed.

It may be provided to activate the system 101, 301 in a time-controlled manner by the RTC 103. It may also be provided to make the activation dependent on external circumstances such as vibrations or the available energy.

It should be additionally noted that a "shutdown" of a module or an assembly can also be a "deactivation" of a module or an assembly with the aim of reducing the required power.

Further, it should be noted that the switching elements 113 may also be integrated into the processor 104, 306. It may also be provided that the switching elements 116 may be integrated or implemented in the FPGA 307. It may also be provided that the FPGA may be supplemented by additional external memory.

It may be considered a core idea of the present disclosure to provide multiple power domains in a radar system that are activated for different lengths of time. It may also be considered an aspect to combine specialized hardware components in such a way that, conditioned by their structure and/or conditioned by the respective task in the system, they interact in such a way that an energy-saving system is realized in the overall result. In this way, the energy storage 102 can be kept small. In addition, only a minimum amount of energy is consumed per measurement cycle, which maximizes the service life of a battery if the maximum energy budget of a battery is available.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A radar sensor for detecting a level of a product or a topology of a surface of a product, comprising:
   a permanently operated clock;
   an energy storage;
   a computing circuit;
   a radar chip;
   a first switching arrangement; and
   a wireless communication module,
   wherein the clock is configured to drive the first switching arrangement at a predetermined time to close a first power supply line to supply power from the energy storage to the computing circuit to activate the computing circuit,
   wherein the computing circuit is configured to drive the first switching arrangement after its activation to close a second power supply line in order to supply the radar chip with the power from the energy storage that detects the level or the topology, and
   wherein the computing circuit is further configured to drive the first switching arrangement after activation thereof to close a third power supply line to provide the wireless communication module with power from the energy storage that permits operation thereof.

2. The radar sensor of claim 1, further comprising:
   a second switching arrangement,
   wherein the computing circuit is further configured to drive the second switching arrangement after activation thereof to close a control line to send control signals from the computing circuit to the radar chip.

3. The radar sensor according to claim 2, further comprising:
   a third switching arrangement,
   wherein the computing circuit is further configured to drive the third switching arrangement after activation thereof to send measurement data from the radar chip to the computing circuit.

4. The radar sensor according to claim 2, further comprising:
   a wireless communication module,
   wherein the computing circuit further is configured to drive the first switching arrangement after activation thereof to close a third power supply line to provide the wireless communication module with power from the energy storage that permits operation thereof.

5. The radar sensor according to claim 2, further comprising:
   a hermetically sealed housing without electrical interfaces to outside.

6. The radar sensor according to claim 1, further comprising:
   a third switching arrangement,
   wherein the computing circuit is further configured to drive the third switching arrangement after activation thereof to send measurement data from the radar chip to the computing circuit.

7. The radar sensor according to claim 6 further comprising:
   a wireless communication module,
   wherein the computing circuit further is configured to drive the first switching arrangement after activation thereof to close a third power supply line to provide the wireless communication module with power from the energy storage that permits operation thereof.

8. The radar sensor according to claim 6, further comprising:
   a hermetically sealed housing without electrical interfaces to outside.

9. The radar sensor according to claim 1, further comprising:
   a hermetically sealed housing without electrical interfaces to outside.

10. The radar sensor according to claim 1, further comprising:
    a further energy storage; and
    a fourth switching arrangement,
    wherein the clock is configured to trigger the first switching arrangement at a predetermined time to close the first power supply line to first charge the further energy storage with power from the energy storage and then to trigger the fourth switching arrangement to supply the computing circuit with power from the energy storage and the further energy storage and thus activate the computing circuit.

11. A method for detecting a level of a product or a topology of a surface of a product, comprising:
    controlling a first switching arrangement at a predetermined time by a device internal clock to close a first power supply line to supply power from a device internal energy storage to a computing circuit to activate the computing circuit;
    controlling the first switching arrangement by the computing circuit to close a second power supply line to supply a radar chip with the power from the energy storage that detects the level or topology; and
    driving, by the computing circuit, the first switching arrangement after activation thereof to close a third power supply line to provide a wireless communication module with power from the energy storage that permits operation thereof.

12. The method of claim 11, further comprising:
    driving, by the computing circuit, a second switching arrangement after activation thereof to close a control line to send control signals from the computing circuit to the radar chip.

13. The method of claim 11, further comprising:
    driving, by the computing circuit, a third switching arrangement after activation thereof to send measurement data from the radar chip to the computing circuit.

14. The method of claim 11, further comprising:
    triggering, by the clock, the first switching arrangement at a predetermined time to close the first power supply line to first charge a further energy storage with power from the energy storage and then to trigger a fourth switching arrangement to supply the computing circuit with power from the energy storage and the further energy storage and thus activate the computing circuit.

15. A non-transitory computer readable medium having stored thereon a program element that, when executed by a computing circuit of a radar sensor causes the radar sensor to implement a method for detecting a level of a product or a topology of a surface of a product, comprising:
    controlling a first switching arrangement at a predetermined time by a device internal clock to close a first power supply line to supply power from a device internal energy storage to a computing circuit to activate the computing circuit;
    controlling the first switching arrangement by the computing circuit to close a second power supply line to supply a radar chip with the power from the energy storage that detects the level or topology; and driving, by the computing circuit, the first switching arrangement after activation thereof to close a third power supply line to provide a wireless communication module with power from the energy storage that permits operation thereof.

* * * * *